United States Patent [19]

Tamaki et al.

[11] 3,710,512

[45] Jan. 16, 1973

[54] PROCESS FOR PREPARING LICORICE EXTRACT-LIKE MATERIAL FOR TOBACCO FLAVORING

[75] Inventors: Einosuke Tamaki, Tokyp; Isao Morishita, Hiratsuka; Ko Nishida, Tokyo; Kunio Kato, Kawasaki; Takashi Matsumoto, Tokyo, all of Japan

[73] Assignee: The Japan Monopoly Corporation, Tokyo, Japan

[22] Filed: Sept. 15, 1971

[21] Appl. No.: 180,867

[30] Foreign Application Priority Data

Nov. 16, 1970 Japan..............................45/100154

[52] U.S. Cl. .........................47/58, 99/140, 252/522
[51] Int. Cl. ..........................A01g 31/00, A23l 1/26
[58] Field of Search ..............47/58; 99/140; 252/522

[56] References Cited

UNITED STATES PATENTS

| | | | |
|---|---|---|---|
| 2,747,334 | 5/1956 | Routien et al. | 47/58 |
| 3,514,900 | 6/1970 | McDade | 47/58 |
| 3,628,287 | 12/1971 | Staba et al. | 47/58 |

*Primary Examiner*—Robert E. Bagwill
*Attorney*—Toren & McGeady

[57] ABSTRACT

Process for preparing licorice extract-like material for tobacco flavoring includes the steps of: culturing a fragment of plant body of licorice plant in a liquid medium for plant tissue-culture under aerobic condition, to derive licorice cells suspended in the liquid, boiling the cultured broth containing the licorice cells, filtrating said broth after cooling, and concentrating said filtrate to 1/40 – 1/50 by volume to make it into concentrated extract.

3 Claims, No Drawings

PROCESS FOR PREPARING LICORICE EXTRACT-LIKE MATERIAL FOR TOBACCO FLAVORING

The present invention relates to a process for preparing licorice extract-like material for tobacco flavoring using the tissue-culture of licorice plants as raw materials.

The term "callus" in the present specification and claims refers to an amorphous lump of cells having lost organ-forming capacity, which is formed when a fragment of the said plant body is tissue-cultured on a solid medium, and which shows an external form resembling the agglutination tissue of plant body. And the term "licorice cells" refers to a fine flocky dispersion of the cells formed when pieces of the said callus are further inoculated and tissue-cultured in a liquid medium in aerobic condition. And such a liquid containing licorice cells is represented by the term "cultured broth."

The licorice extract used for tobacco flavoring has hitherto been prepared by such a way that cut pieces of the root of licorice plant grown spontaneously is extracted in water, ethanol is added to the filtrate of resulting extracted liquid, and this mixture is filtrated again after being allowed to stand, and the filtrate thus obtained is concentrated by evaporation. The licorice extract contains glycyrrhizin ($C_{42}H_{62}O_{16}$) as principal ingredient and tastes highly sweet and slightly bitter. The licorice root has hitherto been used for a long time as an indispensable antidote, abirritant or anodyne, while it is efficacious for gastric ulcer and duodenal ulcer. And the licorice extract prepared from the licorice root are prevalently used as sweetenings and excipient for various kinds of medicines and foods.

However, the licorice plants can grow only on the limited regions in the world, and therefore the production of the licorice root and industrial reprocessing thereof has necessarily been restricted regionally.

The plant body is generally composed of innumerable cells, which form tissues and organs of the plant and perform living phenomena thereby. It was found lately that a complete plant body can be grown directly from any voluntarily taken-up cells of the plant body by so-called tissue-culturing of said cells, and such tissue-culture has been applied for studies for the improvement of plant breeding by selecting cells having excellent genetic character of the plant. And further it is known that so-called callus can be formed on solid medium by means of such tissue-culture, while suspension of fine cells of the plant can be obtained by tissue-culturing said callus in liquid medium under aerobic condition.

We have investigated such tissue-culture using licorice plants, and found that the licorice cells derived from the callus and the cultured broth containing said licorice cells can be made into licorice extract-like material for tobacco flavoring.

An object of the invention is to provide a simple and facile process for preparing licorice extract-like material capable of being used for tobacco flavoring.

Another object of the invention is to provide the industrial process for preparing licorice extract-like material for tobacco flavoring, which is not influenced by land- and soil-conditions or climatic conditions.

Still another object of the invention is to provide process for preparing licorice extract-like materials for tobacco flavoring using various species of licorice plants which spontaneously grow only in specific districts and have respective merits.

Other objects of the invention will readily be understood from the following explanations.

According to the invention, various kinds of licorice plants can be used for tissue-culture, for example, *Glycyrrhiza glabra Linne* var. *glandulifera Rgl. et Herd.*, *G. uralensis D. C.*, *G. echinata L.*, and the like. The conventional medium-compositions for tissue-culture mentioned in the literatures, for example, the media called White's medium (1943), Heller's medium (1953), Murashige and Skoog's medium (1962), and Linsmaier and Skoog's medium (1965), are used in the present invention. These known media consist of the inorganic substances and other minute elements which have hitherto been used in the medium of water-culture method for plant, saccharide, auxins (growth-promoting substance), cytokinins, vitamins and amino acids. In particular, the followings are used in these media: inorganic salts selected from potassium chloride, calcium chloride, potassium nitrate, calcium nitrate, sodium nitrate, ammonium nitrate, sodium sulfate, magnesium sulfate, potassium phosphate, sodium phosphate, ferric chloride, ferric sulfate, $Na_2$-EDTA ($Na_2$-Ethylenediamine tetra-acetic acid), manganese sulfate, zinc sulfate, boric acid, potassium iodide, copper sulfate, sodium molybdate, aluminum chloride, cobalt chloride, and the like, saccharide selected from sucrose, glucose, fructose, mannose, and the like, auxins such as 2,4-dichlorophenoxyacetic acid, α-naphthaleneacetic acid, indol-3-acetic acid, cytokinins such as kinetin, vitamins such as thiamin, hydrochloride, pyridoxin hydrochloride, nicotinic acid, myo-inositol, biotin, and amino acids such as Glycin. Table 1 shows examples of conventional medium-compositions for tissue-culturing.

TABLE 1

| Constituents (mg./l) | White's medium | Murashige & Skoog's medium | Linsmaier & Skoog's medium |
|---|---|---|---|
| KCl | 65 | | |
| $CaCl_2.2H_2O$ | | 440 | 440 |
| $KNO_3$ | 80 | 1900 | 1900 |
| $Ca(NO_3)_2.4H_2O$ | 300 | | |
| $H_3BO_3$ | 1.5 | 6.2 | 6.2 |
| $MgSO_4 7H_2O$ | 720 | 370 | 370 |
| $Na_2SO_4$ | 200 | | |
| $NH_4NO_3$ | | 1650 | 1650 |
| $KH_2PO_4$ | | 170 | 170 |
| $NaH_2PO_4$ | 16.5 | | |
| $Fe_2(SO_4)_3$ | 2.5 | | |
| $FeSO_4 7H_2O$ | | 27.8 | 27.84 |
| $Na_2EDTA$ | | 37.34 | |
| $MnSO_4.4H_2O$ | 7 | 22.3 | 22.3 |
| $ZnSO_4.7H_2O$ | 3 | 11.5 | 8.6 |
| KI | 0.75 | 0.83 | 0.83 |
| $CuSO_4.5H_2O$ | 0.0025 | 0.025 | 0.025 |
| $MoO_3$ | 0.00015 | | |
| $Na_2MoO_2.2H_2O$ | | 0.25 | 0.25 |
| $CoCl_2.6H_2O$ | | 0.025 | 0.025 |
| Thiamine-HCl | 0.1 | 0.1 | 0.4 |
| Pyridoxine-HCl | 0.1 | 0.5 | |
| Nicotinic acid | 0.5 | 0.5 | |
| Myo-inositol | | 100 | 100 |
| Glycine | 3.0 | 2.0 | |
| Kinetin | | 0.2 | 0.2 |
| Indole acetic acid | | 2.0 | 2.0 |
| Sucrose | 20000 | 30000 | 30000 |

In the present invention, for example, in order to tissue-culture the plant body of licorice plant, fragments of leaf, stem, root, flower, seed or other organs or tissues of the plant are washed, surface-sterilized, placed on the sterile agar medium for tissue-culture which is contained in Erlenmeyer's flask plugged with cotton wool and has one of those compositions as described in Table 1, and are incubated at 25°–30 °C. Said fragments of organs or tissues swell and white or yellowish-white callus is derived in 2-3 weeks. Such callus can be gradually made purer by means of repeating the similar solid medium-culturing, that is, by inoculating fresh solid medium by turns with small pieces of callus which have been cut off from callus formed in the previous solid medium-culturing.

The callus thus reformed and refined on the solid medium is then inoculated into a liquid medium having one of those compositions as described in Table 1, and cultured on a shaker at temperatures of 25°–30 °C for 2-3 weeks. The inoculum is about 3 g. (by fresh weight) of callus to 100 ml. of liquid medium, and the callus propagates in the culture liquid in the state of flocky suspension, that is, as "licorice cells." These licorice cells are formed finer by repeating the similar shake-culture in liquid medium, that is, by inoculating fresh liquid medium by turns with a portion of the previously cultured broth containing licorice cells.

The cultured broth obtained in the shake-culture is, after scaled-up by turns, inoculated into a liquid medium set in a fermenter made of stainless steel, and cultured with aeration while being agitated gently. The quantity of inoculum is one tenth of the quantity of whole medium, and intensive agitation is unfavorable because the membranes of licorice cells are broken thereby. The amount of air to aerate is 0.5–20 liters/liter of medium/minute and the culturing period is 2–3 weeks, that is, same as that of the above shake-culture. The yield of dried weight of these licorice cells is 30–35 percent of sugar consumed in the cultured broth and amounts to 5–7 g. per liter of the medium.

In connection with the above explanation, it is observed that it takes 2–3 weeks for each of agar medium culture, liquid shake-culture and aeration-liquid culture with stirring, totalling to such a long term as 6–9 weeks, to obtain cultured broth containing licorice cells as raw materials for licorice extract-like material in the invention, and moreover such a total culture term is remarkably prolonged when both of the agar medium culture and the liquid shake-culture are repeated as described above. However, when the cultured broth, where licorice cells have been propagated in homogeneous suspension, is once obtained in the aeration-culture with stirring, such cultured broth will be able to be obtained virtually within a short term by adopting such a semi-continuous process, where one portion of the cultured broth is taken out to leave the other portion thereof in the fermenter and fresh sterile medium is supplemented to the remaining broth so as to carry on the culturing of licorice cells again. For example, when about a half of the volume of the cultured broth is taken out from the fermenter and aeration-culture is carried on after supplying the fermenter with fresh medium, subsequent logarithmic growth-phase of licorice cells will be approximately completed in 5–7 days, and consequently a half of approximately finished cultured broth can be obtained every 5–7 days.

According to the present invention, the said licorice cells and cultured broth obtained by tissue-culture of licorice plants are made into licorice extract-like material for tobacco flavovoring. That is, the cultured broth containing the licorice cells is boiled using a reflux condenser for 1–2 hours, to extract the ingredients of the licorice cells into the liquid phase, and this heated cultured broth is, after having been cooled and filtrated, concentrated to 1/40 – 1/50 by volume thereof. This concentrated extract contains much saccharide and a little amount of glycyrrhizin, however it has so good aroma that it is suitable for tobacco flavoring.

Table 2 and 3 illustrate respectively an example of composition of the licorice extract-like material prepared according to the invention and the result of a sensory test of cigarettes flavored by using the same. The specific gravity, sugar as well as reducing sugar, and glycyrrhizin in Table 2 were estimated respectively by the Ostwald's method, Somogyi's method and Robert H. Curdiff's method (Analytical Chem. 36, 1871 (1964) ). And the result of the sensory test (adopting pair-test method performed by panel consisting of six professional persons) in Table 3 was expressed by number of persons who praised in composite appraisal based on smell, taste, mildness and physiological lightness of the cigarettes flavored by using respectively the licorice extract-like material prepared in the invention and conventional licorice extract, both derived from *Glycyrrhiza glabra Linne* var. *glandulifera Rgl. et Herd*.

TABLE 2

| Specific gravity | 1200 |
|---|---|
| Sugar | 36.2% |
| Reducing sugar | 32.3% |
| Glycyrrhizin | 1.84% |
| Moisture content | 60% |

TABLE 3

| | Number of persons who praised | Taste |
|---|---|---|
| Licorice extract | 0 | strong sweetness |
| Licorice extract-like material prepared in the invention | 6 | mild and roundish |

It is observed from the Table 2 and 3 that the licorice extract-like material prepared according to the present invention is markedly excellent in tobacco flavoring, in spite of the content of glycyrrhizin thereof being very small.

In the present invention, the contents of glycyrrhizin in the tissue-cultured broth of licorice plants are 0.020–0.025 percent based on the weight of whole broth, and those of glycyrrhizin in the licorice cells are 3–4 percent based on the dried weight thereof.

The following examples serve to illustrate the invention without however limiting it:

EXAMPLE 1

A fragment of the root of Glycyrrhiza glabra Linne var glandulifera Rgl. et Herd. was washed with deionized water, soaked in 95 percent ethanol for several seconds, further in 2 percent sodium hypochlorite solution for about 10 minutes and thereafter washed with sterile water. Said fragment of root was placed on a sterilized solid culture-medium, which was prepared by adding 1 percent of agar to the composition of Linsmaier & Skoog's medium shown in Table 1 and put in a cotton-plugged Erlenmeyer's flask, and incubated at temperatures of 26°–30° O for about 3 weeks. When the fragment of root swelled and came in contact with the solid medium, a callus was derived from that contact point. This callus was cut off, transferred onto a fresh medium having the same composition as the above and cultured. After such a sub-culture of callus had been repeated thrice, about 3 g. (by fresh weight) of the callus formed in the last culturing were inoculated into 100 ml. of liquid medium of the same composition but without agar held in a 500 ml.-Sakaguchi's flask, and cultured on a shaker at temperatures of 28°–30° C. After about 3 weeks, licorice cells were propagated in suspension in the liquid. About 10 ml. of this cultured broth were transferred into 100 ml. of fresh liquid medium of the same composition and shake-cultured again. After such a sub-culture had been repeated five times, the cultured broth, where licorice cells were more finely and uniformly dispersed, was obtained.

About 100 ml. of said cultured broth were then inoculated into 1 liter of liquid medium of the same composition held in a 3 liter-flask and shake-cultured for about 2 weeks. The cultured broth obtained in the above 3 liter-flask was then inoculated into 11 liters of liquid medium held in 15 liter-jar-fermenter, and cultured at a temperature of 28° C, under a aeration rate of 8 liters/minute and a agitating rate of 50 r.p.m. After about 2 weeks, approximately 5 liters, that is, a half of the cultured broth in the jar-fermenter, where licorice cells had been propagated in suspension, were taken out and 5.5 liters of fresh medium, which had been separately prepared and sterilized, were supplemented to the fermenter, and aeration-culture with agitating was carried on under the same conditions as described above except that the aeration rate was increased to 12 liters/minute. After 6 days, about 5 liters of cultured broth were similarly taken out of the fermenter and fresh medium was supplemented to the fermenter again. Thus, licorice cells of about 6 g. by dried weight per liter of the cultured broth on the average were obtained every 6 days, by repeating the abovementioned semi-continuous culture of the licorice cells.

10 liters of the cultured broth collected as described above containing 58 g. of licorice cells were boiled using a reflux condenser for 2 hours, and said broth were filtrated after being cooled. The filtrate was concentrated under reduced pressure to obtain 250 g. of licorice extract-like material. The cigarettes sprinkled with ten-fold aqueous dilution of this licorice extract-like material had good smell and taste.

EXAMPLE 2

Licorice cells were propagated by the similar operation to that in Example 1 except that a fragment of the stem of *G. Uralensis D.C.* was used instead of a fragment of the root of *Glycyrrhiza glubra Linne* var. *glandulifera Rgl. et Herd*. 10 liters of the cultured broth containing 52 g. of licorice cells were boiled, filtrated and concentrated in the same way as described in Example 1, and 215 g. of licorice extract-like material for tobacco flavoring were obtained.

EXAMPLE 3

Licorice cells were propagated by the similar operation to that in Example 1 except a fragment of the leaf of *G. echinata L.* being used instead of a fragment of the root of *Glycyrrhiza glabra Linne* var. *glandulifera Rgl. et Herd*. 10 liters of the cultured broth containing 55 g. of licorice cells were treated in the same way as described in Example 1, and 215 g. of licorice extract-like material for tobacco flavoring were obtained.

What we claim is:

1. Process for preparing licorice extract-like material for tobacco flavoring which comprises:
   1. culturing a fragment of plant body of licorice plant on a solid agar medium for plant tissue-culture further comprising a mixture of growth-promoting agents selected from the group consisting of saccharide, inorganic salts, auxins, cytokinins, vitamins and amino acids, to derive an amorphous lump of cells, that is, callus, on said solid medium,
   2. inoculating said callus into a liquid medium of the same composition as described above, and culturing the same under aerobic condition, so as to propagate it in a state of licorice cells suspended in the liquid,
   3. boiling the cultured broth containing the licorice cells using a reflux condenser,
   4. filtrating the said broth after having been cooled,
   5. concentrating said filtrate to 1/40 – 1/50 by volume to make it into concentrated extract.

2. Process described in claim 1, where said licorice plant is one member selected from the group consisting of *Glycyrrhiza glabra L.*, *G. glabra Linne* var. *glandulifera Rgl. et Herd.*, *G. uralensis D. C.* and *G. echinate L.*

3. Process described in claim 1, where concentrating of the filtrate is carried out under reduced pressure.

* * * * *